Figures 1, 2, 3:
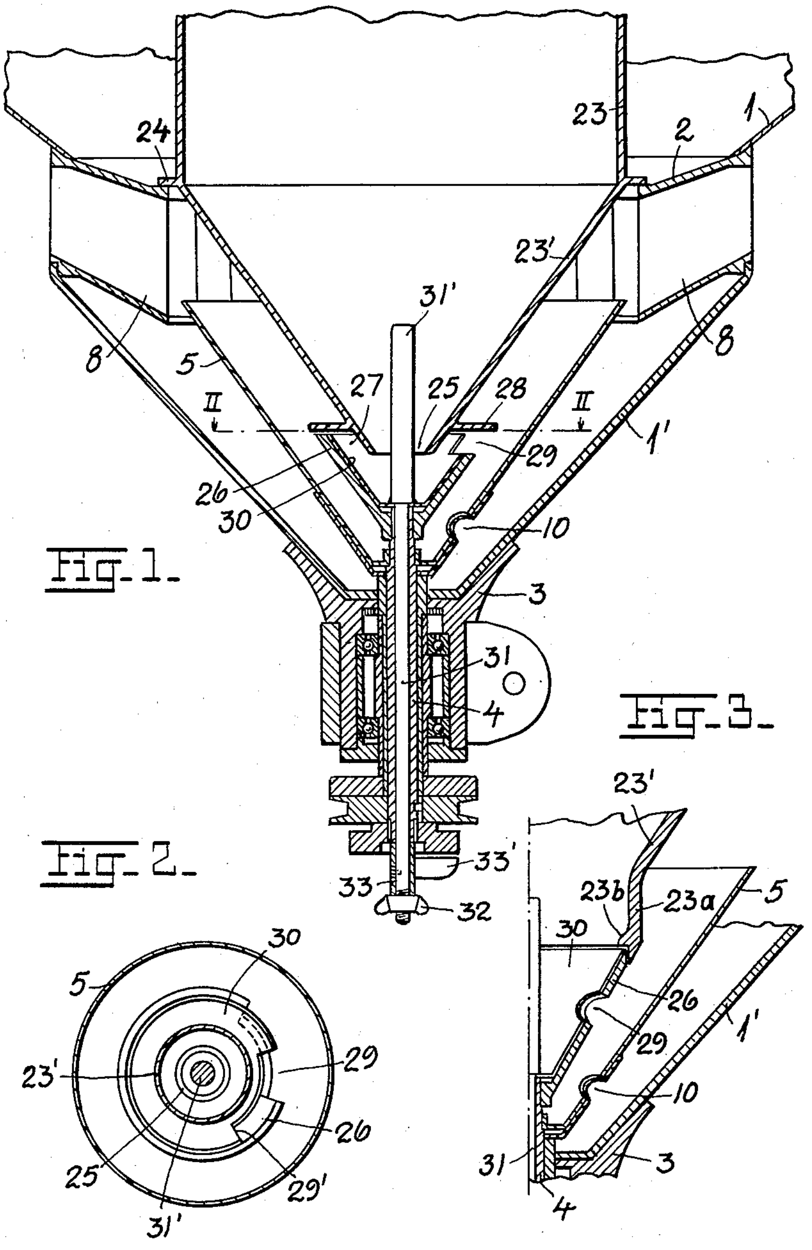

Sept. 15, 1959 S. STOKLAND 2,904,220

AGRICULTURAL MACHINES FOR USE AS SEED PLANTERS AND FERTILIZER DISTRIBUTORS

Filed Feb. 14, 1958

INVENTOR
SIGMUND STOKLAND
BY [signature]
HIS AGENT

United States Patent Office 2,904,220

Patented Sept. 15, 1959

2,904,220

AGRICULTURAL MACHINES FOR USE AS SEED PLANTERS AND FERTILIZER DISTRIBUTORS

Sigmünd Stokland, Oslo, Norway

Application February 14, 1958, Serial No. 715,298

Claims priority, application Norway February 20, 1957

8 Claims. (Cl. 222—140)

This invention relates to improvements in agricultural machines for use as seed planters and/or fertilizer distributors of the type disclosed in my co-pending application Serial No. 575,446, filed April 2, 1956 now Patent No. 2,874,878, issued Feb. 24, 1959.

In the said application there is disclosed an agricultural machine for use as a seed planter and/or fertilizer distributor having a container in which the first material intended for distribution by the machine is stored, a plurality of material receiving devices, and an upwardly diverging cup-shaped member mounted in the container for rotation about its axis of symmetry. The cup-shaped member has an upper part terminating in an open top and a lower part having at least one regulatable opening therein, and the material receiving devices are in communication with the container in the proximity of the upper edge of the cup-shaped member. The machine further comprises separator means in the container spaced from the open top of the cup-shaped member for guiding the first material to the exterior of the cup-shaped member and through the opening therein into the cup-shaped member, an upper container for a second material to be distributed or planted disposed in the separator means and having an outlet for discharge of the second material into the interior of the cup-shaped member, and means for regulating the area of the outlet, the arrangement being such that when the machine is in operation the materials in the cup-shaped member flow upwardly toward and past the upper edge thereof and into the material receiving devices when the cup-shaped member is rotated, whereby two different types of seed and/or fertilizer may be distributed or planted simultaneously.

In such types of machines, the second material from the upper container, especially when it contains a fertilizer, is not distributed under all circumstances as evenly as is desirable, because the supply of the second material from the upper container tends to vary with the consistency of the material and the rate of rotation of the machine.

It is an object of the present invention to provide a machine which is capable of avoiding the above defect.

According to the present invention, there is provided a machine similar to that disclosed in my aforesaid copending application, wherein a second upwardly diverging cup is disposed for rotation within the first mentioned cup, the interior of the second cup being in communication with the upper container for the second material, there being at least one regulatable outlet in the second cup so that the second material may be fed from the second or upper into the first mentioned cup when the machine is in operation.

For a better understanding of the present invention, and to show how the same may be carried into effect, reference will now be made to the accompanying drawings in which like reference numerals indicate like parts, and in which:

Figure 1 is a vertical, axial section through the seed container of an agricultural machine for use as a seed planter and/or fertilizer distributor, Figure 2 is a transverse section taken on the line II—II of Figure 1, with a part of the machine removed, and Figure 3 is a fragmentary sectional view, similar to Figure 1, showing a somewhat altered embodiment.

Referring now to Figure 1, a cylindrical seed container 1 formed with a frusto-conical base, is connected by means of an apertured, annular, intermediate portion or separator 2, to a conical or funnel-shaped lower or outer container 1', there being a supporting sleeve 3, formed for the reception of the lower container 1'. An upwardly diverging, rotatable distributing cup 5, which is preferably conical in shape, is secured to a vertical hollow shaft 4, rotatably supported in the sleeve 3. The cup 5 is rotatable about a vertical axis, the lower portion of the cup being provided with an opening 10, the exposed area of which opening may be regulated. The cup 5 is radially spaced from the lower walls of the outer container 1' so that the lower portion of the cup 5 is submerged in the seed in the container 1' when the machine is in use.

A second or upper container 23 is mounted centrally within the container 1, an external flange 24 of the container 23 being arranged to rest on the annular member 2, so that the container 23 is supported by the annular member. The container 23 is provided with a funnel-shaped lower portion 23' extending into the cup 5, and having at its lower end an outlet or discharge opening 25. The taper of the portion 23' is preferably the same as that of the funnel 5.

To the upwardly extended end of the shaft 4, which shaft carries the distributing cup 5, there is connected a second upwardly diverging cup 26. The second cup 26 is co-axial with, disposed within, and radially spaced from the lower walls of the cup 5.

The second cup 26, the angle of divergence of the wall of which cup is the same as that of the wall of the distributing cup 5, is so arranged that the upper part of the cup 26 surrounds the lower end of funnel-shaped lower portion 23' of the second container 23, and is radially spaced from the portion 23'. The annular space 27 formed between the upper portion of the second cup 26 and the lower end of the portion 23' of the second or upper container 23 is covered or closed by a radial flange 28 which may be integral with the portion 23' or may be secured thereto.

A portion of the wall of the cup 26 is cut away so that a discharge aperture or opening 29 is formed therein, the opening breaking the upper rim of the cup.

In order to regulate the free area of the opening 29, a lining cup 30 forming a closure member, is slidably and rotatably mounted within the cup 26. The lining cup 30 is formed with an opening or aperture 29' (Fig. 2) which is so disposed that it can register with the outlet or discharge opening 29. Thus by rotating the lining cup 30 relative to the cup 26, the opening between the interior and the exterior of the cup 26 may be reduced or increased, as desired, the exposed area of this opening depending upon the position of the lining cup 30 with respect to the second cup-shaped member 26. More than one regulatable opening may be formed in the cup 26.

The lining cup 30 is secured to a second shaft 31, which is co-axial with, and is rotatably supported in an axial bore of the aforementioned shaft 4, which latter shaft carries the cups 5 and 26. The shafts 4 and 31 are releasably connectable for rotation with each other, as will be hereinafter described.

The lower end of the second or inner shaft 31 is formed with a screw-thread with which a nut 32 is adapted to mesh to cause a sleeve member 33, which is mounted so as for movements in the axial directions of the shaft 31 but is not rotatable thereon, to bear against the lower end of the hollow outer shaft 4 and to thereby connect shaft 31 with shaft 4. The sleeve member 33 is provided with a pointer 33' for co-operation with a scale (not shown), so that the exposed area of the opening 29 may be accurately adjusted.

When the machine is in operation the first and second cups 5, 26 and closure member 30 rotate at the same speed. The material flows from the second container 23, 23' through the outlet 25 into the second or inner cup 26. Due to the centrifugal force, the material flows upwardly along the diverging wall of the cup 26, or of the lining cup 30, and is thrown against the underside of the flange 28 which latter is stationary with respect to the cups 5, 26, and member 30, the material being forced from cup 26 through the discharge opening 29 into the distributing cup 5. Material flowing through the opening 29 into the cup 5 is expelled from the cup 5 by centrifugal force, either alone or simultaneously with material which has passed into the cup 5 from the upper container 1 by way of the aperture (not shown) in the member 2, the lower or outer container 1' and the opening 10. The mixture of two materials expelled from the distributing cup 5 passes, by reason of its remaining kinetic energy, into the ports or channels 8 of the annular member or separator 2.

Extensive tests have proved that by providing a stationary flange 28 adjacent the opening 29, uniform discharge of material through the opening 29 is obtained regardless of the consistency of the material and the rate of rotation of the second cup-shaped member 26.

The quantity of material discharged through the opening 29 to the distributing cup 5 may be regulated with desired accuracy by adjusting the exposed area of the opening 29.

In the embodiment shown in Fig. 3, the container 23' for the second material is formed with a cylindrical lower portion 23*a*, and the open upper end of second cup 26 projects freely rotatably into the mouth of portion 23*a* below a shoulder 23*b* formed in the latter to close the open lower end of portion 23*a*. The opening 29 is disposed at some distance below the upper edge of second cup 26.

In order that the material in the lower part 23' of the second container 23 may be stirred when the machine is in operation, the shaft 31, carrying the adjustable closure member 30, is extended upwardly into the portion 23', as shown at 31'. The extension 31' may, in order to facilitate such stirring, be provided with radially extending projections (not shown).

I claim:

1. In an agricultural machine for distributing seeds, fertilizers, and like materials, in combination: an outer container for receiving a first material; a first upwardly diverging substantially cup-shaped member in said container having a substantially vertical axis of symmetry, an upper part terminating in an open top, and a lower part having at least one opening through which the first material may flow into said member; means for rotating said member about its axis; a second container for receiving a second material, said second container being located above said member and having a lower end and an outlet in said lower end; a second upwardly diverging cup-shaped member coaxial with, at least partially received within, and radially spaced from said first member, said second member having an open top, being disposed beneath said outlet for receiving the second material discharged therethrough, having at least one aperture through which the second material may flow into said first member, and being connected for rotation with said first member whereby the first and second materials entering the first member through said opening and said aperture, respectively, flow upwardly toward and past the open top of said first member when said members rotate.

2. The combination as set forth in claim 1, wherein the means for rotating said first member comprises a substantially vertical shaft connected to said first member, extending into the latter, and connected to said second member, said second member being of conical contour.

3. The combination as set forth in claim 1, wherein said second container has an annular shoulder surrounding said outlet, and the open top of said second member extends into close proximity of said shoulder.

4. The combination as set forth in claim 1, wherein said second container comprises a funnel-shaped lower portion having a lower end extending into said second member and defining with the latter an annular space, said outlet being disposed in the lower end of said portion; and further comprising a radial flange connected to said portion and closing the open top of said second member, said aperture being located adjacent to said flange.

5. The combination as set forth in claim 1, further comprising a closure member in said second member having at least one aperture registerable with said first mentioned aperture; and means for locking said closure member in selected positions with respect to said second member whereby to control the exposed area of said first mentioned aperture.

6. The combination as set forth in claim 5, wherein said closure member is a cup-shaped lining rotatably installed in and extending to the open top of said second member.

7. The combination as set forth in claim 1, wherein the means for rotating said first member comprises a substantially vertical hollow shaft connected to said first member, extending into the latter, and connected to said second member; and further comprising a closure member in said second member having at least one aperture registerable with said first mentioned aperture; a second shaft coaxially received for rotation in said hollow shaft and connected to said closure member for rotating same with respect to said second member; and means for releasably connecting the second shaft to said hollow shaft.

8. The combination as set forth in claim 7, wherein said second shaft extends upwardly through said outlet and into said second container.

No references cited.